United States Patent [19]
Jeffery

[11] Patent Number: 5,458,402
[45] Date of Patent: Oct. 17, 1995

[54] FAIL SAFE WORK BRAKE SYSTEM

[75] Inventor: David R. Jeffery, Schnecksville, Pa.

[73] Assignee: Mack Trucks, Inc., Allentown, Pa.

[21] Appl. No.: 179,957

[22] Filed: Jan. 11, 1994

[51] Int. Cl.⁶ .................................................. B60T 13/28
[52] U.S. Cl. ...................... 303/13; 188/106 P; 188/170; 303/9.76; 303/14; 303/71; 303/DIG. 3; 303/40
[58] Field of Search .................... 303/13, 7, 8, 9, 303/71, 9.76, 2–3, 14–15, DIG. 1, DIG. 2, 84.1, 84.2, DIG. 3, 18, 40; 188/170, 106 P, 106 R, 106 F; 477/184

[56] References Cited

U.S. PATENT DOCUMENTS

| | | |
|---|---|---|
| Re. 31,337 | 8/1983 | Stearns . |
| Re. 32,885 | 3/1989 | Graham . |
| 3,031,036 | 4/1962 | Meyers . |
| 3,102,608 | 9/1963 | Isbell et al. . |
| 3,107,681 | 10/1963 | May ...................................... 303/14 X |
| 3,285,672 | 11/1966 | Avrea ..................................... 303/71 X |
| 3,294,455 | 12/1966 | Valentine .............................. 303/13 X |
| 3,426,870 | 2/1969 | Noland . |
| 3,456,988 | 7/1969 | Gibbons et al. ....................... 303/71 X |
| 3,667,815 | 6/1972 | Zoppi ..................................... 303/40 X |
| 3,777,857 | 12/1973 | Hughes ........................... 188/106 P X |
| 4,003,605 | 1/1977 | Fannin .................................... 303/71 X |
| 4,050,746 | 9/1977 | Durling ...................................... 303/40 |
| 4,057,297 | 11/1977 | Beck et al. .............................. 303/71 |
| 4,121,873 | 10/1978 | Durling .................................. 303/40 X |
| 4,166,654 | 9/1979 | Snodgrass ................................ 303/14 |
| 4,263,991 | 4/1981 | Morgan et al. . |
| 4,281,677 | 8/1981 | Hoffman ............................. 303/84.1 X |
| 4,470,487 | 9/1984 | Blatt . |
| 4,556,259 | 12/1985 | Feldmann et al. ..................... 303/40 X |
| 4,560,034 | 12/1985 | Windish et al. . |
| 4,667,784 | 5/1987 | Cronin . |
| 4,770,470 | 9/1988 | Tarumizu et al. .................. 303/84.2 X |
| 4,973,107 | 11/1990 | Graham ................................. 303/9.76 |
| 5,036,961 | 8/1991 | Eberling et al. .......................... 303/13 |
| 5,154,491 | 10/1992 | Graham . |
| 5,172,958 | 12/1992 | Sell . |
| 5,190,357 | 3/1993 | Goldfein . |
| 5,205,380 | 4/1993 | Paquet et al. . |
| 5,215,170 | 6/1993 | Rapa . |

Primary Examiner—Douglas C. Butler
Attorney, Agent, or Firm—Rothwell, Figg, Ernst & Kurz

[57] ABSTRACT

A work brake system applies a reduced air pressure service brake application as a work brake to hold a heavy duty vehicle in place without actuation of conventional spring brakes during frequent start-and-stop operations of the vehicle, such as in refuse collection. The work brake system includes fail safe features to prevent vehicle roll in the event of loss of air pressure, by providing separate primary and secondary sources of pressurized air, and by automatically diverting to application of spring brakes in the event of primary pressure or signal loss.

8 Claims, 1 Drawing Sheet

FAIL SAFE WORK BRAKE SYSTEM

BACKGROUND OF THE INVENTION

1. Field of the Invention

This invention relates generally to brake systems for heavy duty vehicles, and particularly relates to improvements in pneumatic braking systems having multiple control systems.

2. Description of the Background Art

Pneumatic or air pressure-actuated brake systems for large vehicles are well known. Such brake systems utilize pressurized air to actuate a brake assembly in a brake chamber of the vehicle. Air actuation of the brake assembly is known in the art as a service brake application and is carried out to slow down or stop the vehicle while it is in motion. In addition to service brakes, it is common for heavy duty vehicles to include spring brakes, which are activated in a parking brake application to lock the brake assemblies in a park position when the vehicle is at rest. The brake assembly is locked in the park position through the expansion force of a spring located within the brake chamber, which is kept compressed in the non-activated state through application of air pressure against a diaphragm. Actuation of the spring brakes is effected by venting or exhausting the pressurized air in the lines coupled to the diaphragm, and the spring brakes are deactivated by reintroducing pressurized air into the lines. Such known systems are disclosed, for example, in U.S. Pat. Nos. 5,190,357, 5,172,958 and 5,154,491.

Normal operation of certain heavy duty vehicles such as waste pick-up vehicles and construction industry vehicles demand frequent parking brake applications in a short period of time as a result of numerous start-and-stop operations, which consume large volumes of compressed air. Such operations result in excessive brake system wear, undesirably reducing the useful life of air compressor, air dryer, and brake chamber components, and resulting in increased vehicle maintenance and repair costs.

SUMMARY OF THE INVENTION

The present invention overcomes the disadvantages of the prior art by providing a work brake system in additional to the conventional spring brakes for parking brake applications during start-and-stop operations of the vehicle. Unlike the conventional spring brakes, the novel work brake system of the present invention utilizes a service brake application, as if the operator were actuating the service brake pedals, with reduced air pressure from the normal service brake application to hold the vehicle in place. Such a braking application is designated a work brake according to the present invention. The work brake thus performs the function of a parking brake, but operates as a reduced pressure service brake. The work brake system of the present invention further includes fail safe or safety features whereby loss of air pressure automatically results in the application of the spring brakes to prevent vehicle roll.

In particular, the present invention provides a brake system for a vehicle, comprising a pressurized air actuated service brake arrangement for applying air pressure to a brake chamber of the vehicle in a service brake application of the brake system, a spring brake arrangement for applying a spring force to the brake chamber in a parking brake application of the brake system, and a pressurized air actuated work brake arrangement for applying air pressure to the brake chamber in a work brake application of the brake system.

The present invention further provides a work brake system for a vehicle, comprising a primary source of pressurized air, a secondary source of pressurized air independent of the primary source, at least one brake chamber for application of a service brake to the vehicle upon delivery thereto of pressurized air of a first pressure, and for application of a work brake to the vehicle upon delivery thereto of pressurized air of a second pressure less than the first pressure, a first relay coupled to the primary source for selectively applying to the at least one brake chamber pressurized air of the first and second pressures upon receipt of a service brake signal and a work brake signal, respectively, a service brake control valve for applying said service brake signal to said relay means, and a work brake control valve for applying the work brake signal to the first relay.

In another aspect, the present invention provides a primary source monitoring valve for monitoring the pressure of pressurized air supplied from the primary source to the first relay and transmitting a spring brake signal to a spring brake relay when the pressure of pressurized air supplied from the primary source falls below a predetermined level, and also provides a work brake signal monitoring valve for monitoring the work brake signal, comparing a pressure of the work brake signal with a pressure of pressurized air applied to a brake chamber of a front axle of the vehicle, and transmitting a spring brake signal to a spring brake relay when the pressure of the work brake signal falls below the pressure of the pressurized air applied to the brake chamber of the front axle.

BRIEF DESCRIPTION OF THE DRAWINGS

The present invention will become more fully understood from the detailed description given hereinbelow and the accompanying drawing, which is given for purposes of illustration only and is not limitative of the present invention, and wherein.

DETAILED DESCRIPTION OF THE PREFERRED EMBODIMENT

Figure 1:
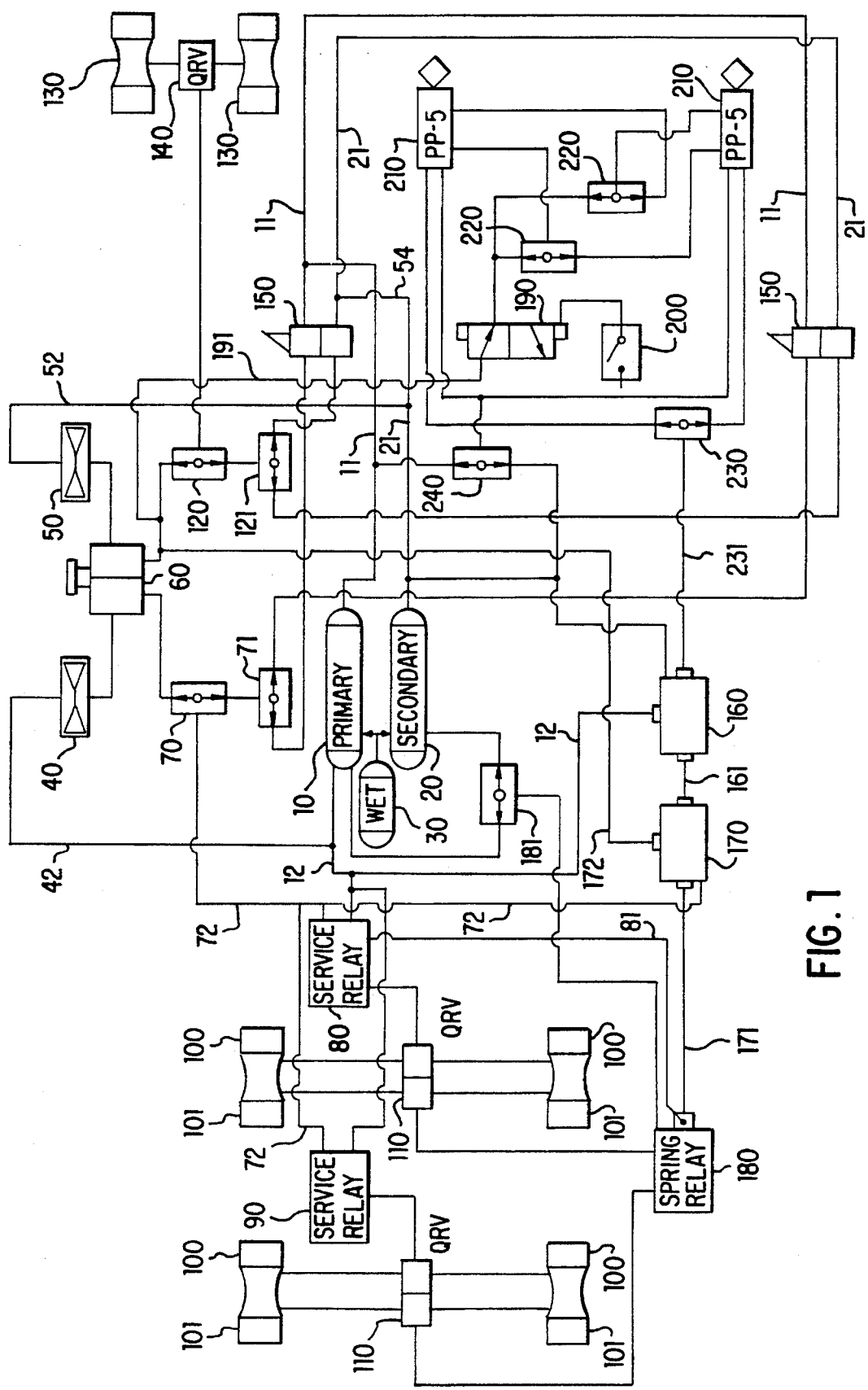
FIG. 1 is the sole figure and is a schematic diagram illustrating one embodiment of a work brake system according to the present invention.

The present invention will now be described in detail with reference to FIG. 1. The brake system is provided with a primary source of pressurized air in the form of a tank 10, and a separate secondary source tank 20. As is known in the art, the tanks are fed by a wet tank 30 which is charged by an air compressor (not shown) mounted in the vehicle.

A first pressure reducing valve 40 is coupled to the primary source 10 via line 42 and a second pressure reducing valve 50 is coupled to the secondary source 20 via lines 52 and 54. The pressure reducing valves are coupled to a work brake control valve 60. The pressure reducing valves 40 and 50 provide a reduced pressure signal from the primary and secondary sources of compressed air, which sources typically are on the order of 100 psi. The reduced pressure signal is preferably on the order of 50 psi and should be no less than 45 psi. The work brake control valve 60 is mounted on the dash of the vehicle and is actuated by an operator to apply a work brake to the vehicle to hold the vehicle in place during a temporary stop on a route such as a refuse collection route.

Upon actuation, the work brake control valve 60 delivers a primary 50 psi reduced pressure signal to double check valve 70 which then delivers this signal to the signal ports of rear axle service relays 80 and 90 via line 72. The service relays are supplied with primary source air at supply ports thereof via line 12. Upon receipt of the 50 psi signal, relays 80 and 90 apply 50 psi of air pressure to rear axle service brake chambers 100 via quick release valves 110, thus applying a work brake to the rear axle of the vehicle. In practice, tees may be substituted for the quick release valves 110 to provide an equivalent function. At the same time, the work brake control valve 60 delivers 50 psi of secondary air pressure from valve 50 to front axle brake chambers 130 through double check valve 120 and quick release valve 140. In effect, the work brake system of the present invention makes and releases a reduced pressure 50 psi service brake application based on the position of the work brake control valve 60.

Treadle valves 150 are provided as normal service brake actuators, and are supplied with primary air signals via line 11 and with secondary air signals via line 21. Upon actuation of either or both of the treadle valves 150, the treadle valves provide service brake signals to the service relays 80 and 90 via double check valve 71 which is coupled to double check valve 70, and the treadle valves further provide secondary service brake pressure to the front axle brake chambers 130 via double check valve 120 which is coupled to double check valve 120.

The work brake system of the present invention is provided with fail safe features which automatically divert to spring brake application should a loss of air pressure occur while the vehicle is being held by the work brake. A pressure loss in the secondary circuit is compensated by the primary circuit remaining active since the primary pressure circuit is isolated from the secondary circuit through the use of check valves. Such an occurrence will result in failure of the front axle brakes, but the rear axle brakes still provide sufficient force to hold the vehicle stationary. Alarm mechanisms such as a buzzer or light are provided to alert the operator to the loss of secondary pressure, and the drop in air pressure will be detectable on a pressure gauge mounted on the vehicle dash.

A spring brake inversion valve 160 monitors the air pressure of the primary source at the rear axle relay 80 through supply line 12. Upon loss of primary air supply pressure, the inversion valve sends a spring brake signal to spring relay 180 via line 161, service line protection valve 170, and line 171. In response to the spring brake signal, spring relay 180 applies an exhaust signal to the quick release valves 110 to exhaust air from the lines coupled to the spring brake chambers 101 of the rear axles, thereby actuating the spring brakes. As is well known, spring brake relay 180 is supplied with air pressure from either source via double check valve 181 to pressurize the spring brake lines in order to deactivate the spring brakes. Application of the service brake by relay 80 also causes a signal to be supplied to the control port of spring relay 180 via line 81 to deactivate the spring brake.

The service line protection valve 170 monitors the primary 50 psi work brake signal on line 72. Once the work brake is activated by delivery of the primary work brake signal, the service line protection valve 170 continuously compares the pressure of the work brake signal on line 72 with the pressure of the secondary source delivery via line 172 which is coupled to the secondary output line of the work brake control valve 60. If the pressure of the primary work brake signal falls below the secondary delivery pressure, the service line protection valve 170 applies the spring brakes via a spring brake signal to spring brake relay 180 on line 171.

Emergency electrical solenoid valve 190 monitors the state of the vehicle ignition switch 200 and the work brake signal via line 191. Should the operator turn off the ignition switch after application of the work brake, the solenoid valve 190 delivers an air signal to dash-mounted spring brake valves 210 via double check valves 220, causing the spring brake valves 210 to apply the spring brakes via air exhaust signals applied through double check valve 230, line 231, valve 160, line 161, valve 170 and line 171 to spring brake relay 180. The spring brake valves 210 are provided with pressurized air from both primary and secondary sources via double check valve 240.

In practice, the service relay valves 80 and 90 may be implemented by such as Bendix R-12 relays, the spring relay 180 may be implemented by such as Bendix R-14, the spring brake inversion valve 169 by Bendix SR-1, the service line protection valve 170 by Bendix SP-1, and the spring brake valves 210 by Bendix PP-5, or any available equivalents thereof.

The invention having been thus described, it will be apparent to those skilled in the art that the same may be varied in many ways without departing from the spirit and scope of the invention. Any and all such modifications are intended to be covered by the following claims.

What is claimed is:

1. A work brake system for a vehicle, comprising:

a primary source of pressurized air;

a secondary source of pressurized air;

at least one brake chamber means for application of a service brake to said vehicle upon delivery thereto of pressurized air of a first pressure, and for application of a work brake to said vehicle upon delivery thereto of pressurized air of a second pressure less than said first pressure;

first pneumatic relay means coupled to said primary source for selectively applying to said at least one brake chamber pressurized air of said first and second pressures upon receipt of a pneumatic service brake signal and a pneumatic work brake signal, respectively;

service brake control means for applying said pneumatic service brake signal to said first pneumatic relay means via a first signal line;

work brake control means for applying said pneumatic work brake signal to said first pneumatic relay means via said first signal line;

at least one spring brake chamber for application of a spring brake to said vehicle upon exhaustion of pressurized air therefrom;

spring brake pneumatic relay means coupled to said primary source for applying pressurized air to said spring brake chamber in the absence of a spring brake signal and exhausting pressurized air from said spring brake chamber upon receipt of a pneumatic spring brake signal; and primary source monitoring means for monitoring the pressure of pressurized air at said first pneumatic relay means supplied from said primary source and transmitting a pneumatic spring brake signal to said spring brake relay means when the pressure at said first pneumatic relay means supplied from said primary source falls below a predetermined level.

2. A work brake system as set forth in claim 1, wherein said work brake control means further applies pressurized air from said secondary source to a brake chamber of a front axle of said vehicle, further comprising:

work brake signal monitoring means for monitoring said work brake signal, comparing a pressure of said work brake signal with a pressure of said pressurized air applied to said brake chamber of said front axle, and transmitting a spring brake signal to said spring brake relay means when the pressure of said work brake signal falls below the pressure of said pressurized air applied to said brake chamber of said front axle.

3. A work brake system as set forth in claim 2, wherein said work brake control means comprises:

a first pressure reducing valve coupled to said primary source for providing a first work brake signal;

a second pressure reducing valve coupled to said secondary source for providing a second work brake signal; and a work brake control valve for supplying said first work brake signal to said first relay means and for supplying said second work brake signal to said brake chamber of said front axle as said pressurized air.

4. A work brake system as set forth in claim 3, wherein said service brake control means comprises at least one treadle valve coupled to said primary source for providing said service brake signal; and said system further including a double check valve coupled to said treadle valve and said work brake control valve for selectively supplying said service brake signal or said first work brake signal to said first relay means.

5. A work brake system as set forth in claim 4, wherein said at least one treadle valve is further coupled to said secondary source for providing a secondary service brake signal and further comprising a second double check valve coupled to said treadle valve and said work brake control valve for selectively supplying said secondary service brake signal or said second work brake signal to said brake chamber of said front axle.

6. A work brake system as set forth in claim 1, further comprising:

solenoid means coupled to an ignition switch of said vehicle for monitoring said work brake signal and for transmitting a spring brake signal to said spring brake relay means when said ignition switch of said vehicle is turned off after said work brake signal has been produced by said work brake control means.

7. A work brake system for a vehicle as set forth in claim 1, further including first signal line monitoring means for monitoring the pressure of pressurized air in said first signal line and transmitting a pneumatic spring brake signal to said spring brake relay means when the pressure of said first signal line falls below a predetermined level.

8. A work brake system for a vehicle, comprising:

a primary source of pressurized air;

at least one brake chamber means for application of a service brake to said vehicle upon delivery thereto of pressurized air of a first pressure, and for application of a work brake to said vehicle upon delivery thereto of pressurized air of a second pressure less than said first pressure;

first pneumatic relay means coupled to said primary source for selectively applying to said at least one brake chamber pressurized air of said first and second pressures upon receipt of a pneumatic service brake signal and a pneumatic work brake signal, respectively;

service brake control means for applying said pneumatic service brake signal to said first pneumatic relay means via a first signal line;

work brake control means for applying said pneumatic work brake signal to said first pneumatic relay means via said first signal line;

at least one spring brake chamber for application of a spring brake to said vehicle upon exhaustion of pressurized air therefrom;

spring brake pneumatic relay means coupled to said primary source for applying pressurized air to said spring brake chamber in the absence of a spring brake signal and exhausting pressurized air from said spring brake chamber upon receipt of a pneumatic spring brake signal;

primary source monitoring means for monitoring the pressure of pressurized air at said first pneumatic relay means supplied from said primary source and transmitting a pneumatic spring brake signal to said spring brake relay means when the pressure at said first pneumatic relay means supplied from said primary source falls below a predetermined level; and first signal line monitoring means for monitoring the pressure of pressurized air in said first signal line and transmitting a pneumatic spring brake signal to said spring brake relay means when the pressure of said first signal line falls below a predetermined level.

* * * * *